(12) United States Patent
Maemura

(10) Patent No.: US 7,382,476 B1
(45) Date of Patent: Jun. 3, 2008

(54) COMMUNICATION TERMINAL DEVICE, FACSIMILE DEVICE, AND A METHOD OF CONTROLLING COMMUNICATION TERMINAL DEVICE AND FACSIMILE DEVICE

(75) Inventor: Koichiro Maemura, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 869 days.

(21) Appl. No.: 09/653,994

(22) Filed: Sep. 1, 2000

(30) Foreign Application Priority Data

Sep. 3, 1999 (JP) .................................. 11-249630

(51) Int. Cl.
G06F 15/00 (2006.01)
H04N 1/00 (2006.01)

(52) U.S. Cl. .................. 358/1.15; 358/440; 358/402; 709/206

(58) Field of Classification Search ............... 358/440, 358/1.15, 402, 404; 709/206
See application file for complete search history.

(56) References Cited

U.S. PATENT DOCUMENTS

| | | | | |
|---|---|---|---|---|
| 5,293,253 A * | 3/1994 | Kida et al. | ................... | 358/440 |
| 5,307,178 A * | 4/1994 | Yoneda | ....................... | 358/440 |
| 5,724,408 A * | 3/1998 | Morganstein | .............. | 379/88.2 |
| 5,931,905 A * | 8/1999 | Hashimoto et al. | ......... | 709/217 |
| 5,963,340 A * | 10/1999 | Kim | ........................... | 358/440 |
| 6,072,599 A * | 6/2000 | Oba et al. | .................... | 358/444 |
| 6,199,102 B1 * | 3/2001 | Cobb | ......................... | 709/206 |
| 6,239,881 B1 * | 5/2001 | Shaffer et al. | .............. | 358/440 |
| 6,366,950 B1 * | 4/2002 | Scheussler et al. | ......... | 709/206 |
| 6,721,059 B1 * | 4/2004 | Sturgeon et al. | ........... | 358/1.15 |
| 6,721,071 B1 * | 4/2004 | Maruyama | ................... | 358/440 |

FOREIGN PATENT DOCUMENTS

| | | |
|---|---|---|
| JP | 63-131658 | 6/1988 |
| JP | 3205959 | 9/1991 |
| JP | 6-291912 | 10/1994 |
| JP | 10-322535 | 12/1998 |

OTHER PUBLICATIONS

English Translation of JP Publication No. 63-131658.*

* cited by examiner

Primary Examiner—Douglas Q. Tran
Assistant Examiner—Chan S. Park
(74) Attorney, Agent, or Firm—Cooper & Dunham, LLP

(57) ABSTRACT

A communication terminal device and a facsimile device, and a method of controlling the communication terminal device and the facsimile device. The invention provides the communication terminal device capable of concentratedly controlling the information relating to the receipt rejection. The invention is featured in that the above devices are provided with a receipt-rejected communication control medium for collecting the communication control information in connection with the communication relating to the signal arrival from the communication partner not registered in the receipt-allowed communication partner registering table, and storing the collected communication control information in the receipt-rejected communication control information storing medium; a communication control list creating medium for creating the list image information based on the communication control information stored in the above-mentioned receipt-rejected communication control information storing medium; and a list outputting medium for visibly outputting the list image information created by the communication control list creating medium.

31 Claims, 10 Drawing Sheets

| COMMUNICATION CONTROL TABLE | | | | | | | | | |
|---|---|---|---|---|---|---|---|---|---|
| COMMUNICATION CONTROL INFORMATION | | | | | | | | | |
| RECORD NUMBER | FILE NUMBER | TRANS-MITTING/ RECEIVING | COMMUNI-CATION DATE | COMMUNI-CATION START TIME | COMMUNI-CATION PARTNER | MESSAGES EXCHANG-ING MODE | COMMUNI-CATION TIME | NUMBER OF COMMUNI-CATION SHEETS | COMMUNI-CATION RESULT |
| 01 | 0111 | TRANS-MITTING | 99/05/22 | 09:05 | 1122223333 | G3EDM | 0'30" | 2 SHEETS | OK |
| 02 | 0112 | RECEIVING | 99/05/22 | 10:30 | 0123456789 | G3ES | 1'00" | 5 SHEETS | OK |
| 03 | 0113 | RECEIVING | 99/05/23 | 08:12 | 9876543210 | G3S | 5'27" | 21 SHEETS | E |
| 04 | 0114 | TRANS-MITTING | 99/05/23 | 12:15 | 9988776655 | G3ESM | 0'23" | 1 SHEET | OK |
| 05 | 0115 | RECEIVING | 99/05/24 | 14:28 | 4455556666 | G3 | 0'15" | 0 SHEET | UC |
| : | : | : | : | : | : | : | : | : | : |

FIG. 5

| RECEIPT-ALLOWED COMMUNICATION PARTNER REGISTRATION TABLE | 4c |
|---|---|
| 0123456789 | |
| 9876543210 | |
| 9988887777 | |
| 8877775555 | |
| ⋮ | |

FIG. 6

COMMUNICATION CONTROL TABLE ~4b

| RECORD NUMBER | FILE NUMBER | TRANS- MITTING/ RECEIVING | COMMUNICATION CONTROL INFORMATION ||||||||
|---|---|---|---|---|---|---|---|---|---|
| | | | COMMUNI- CATION DATE | COMMUNI- CATION START TIME | COMMUNI- CATION PARTNER | MESSAGES EXCHANG- ING MODE | COMMUNI- CATION TIME | NUMBER OF COMMUNI- CATION SHEETS | COMMUNI- CATION RESULT |
| 01 | 0111 | TRANS- MITTING | 99/05/22 | 09:05 | 1122223333 | G3EDM | 0'30" | 2 SHEETS | OK |
| 02 | 0112 | RECEIVING | 99/05/22 | 10:30 | 0123456789 | G3ES | 1'00" | 5 SHEETS | OK |
| 03 | 0113 | RECEIVING | 99/05/23 | 08:12 | 9876543210 | G3S | 5'27" | 21 SHEETS | E |
| 04 | 0114 | TRANS- MITTING | 99/05/23 | 12:15 | 9988776655 | G3ESM | 0'23" | 1 SHEET | OK |
| 05 | 0115 | RECEIVING | 99/05/24 | 14:28 | 4455556666 | G3 | 0'15" | 0 SHEET | UC |
| ... | ... | ... | ... | ... | ... | ... | ... | ... | ... |

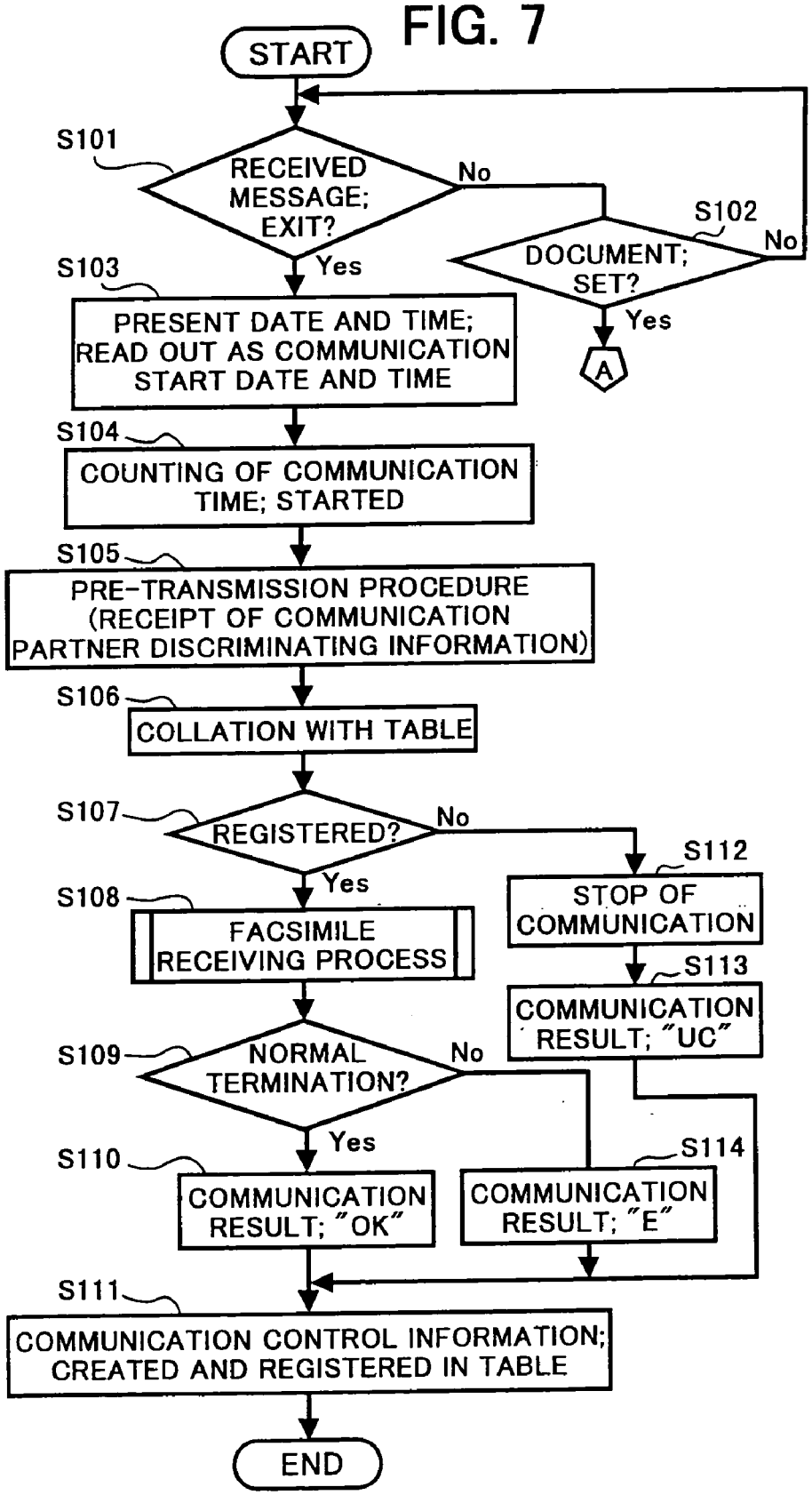

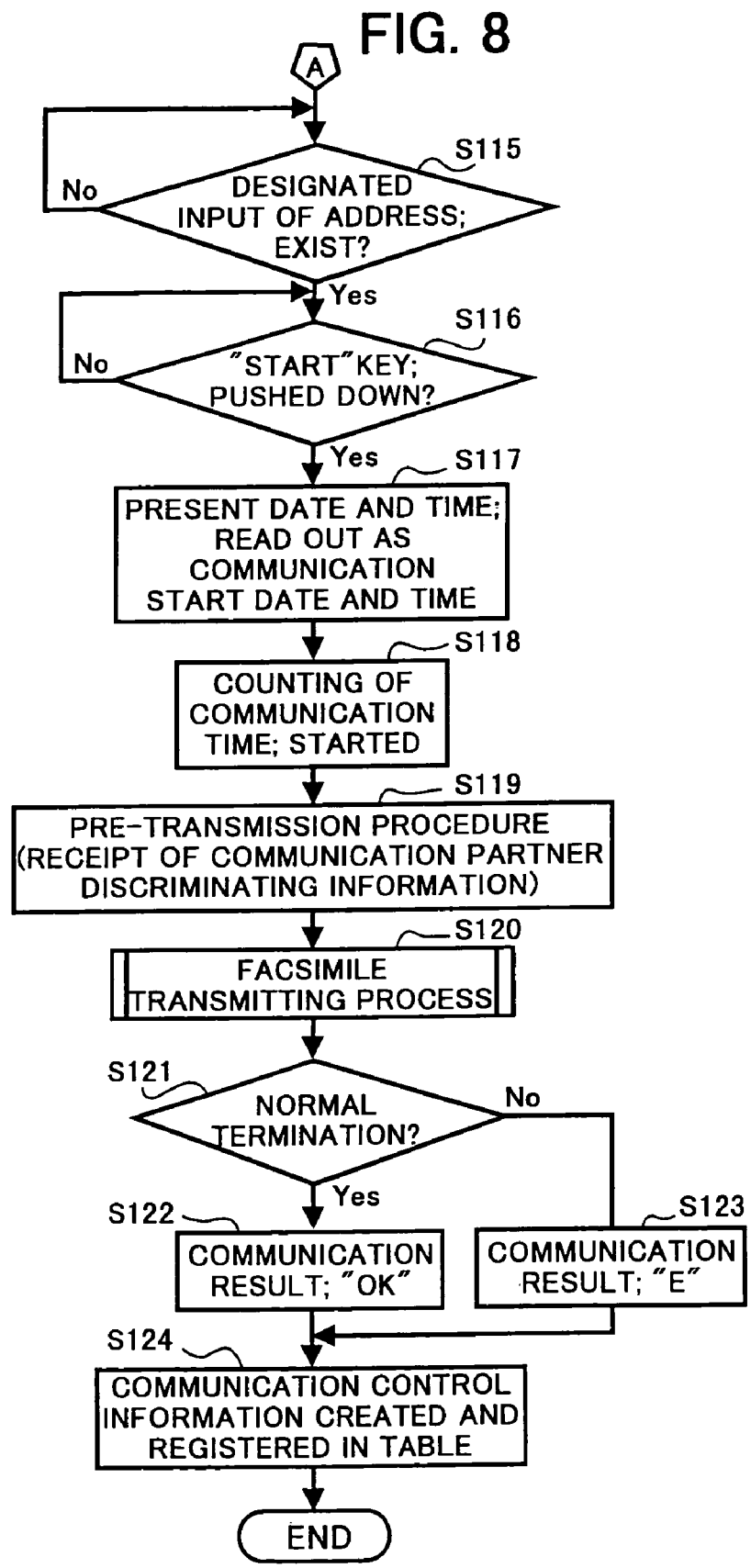

FIG. 10

**\*\*\*\* COMMUNICATION CONTROL REPORT (99/05/23) \*\*\*\***

《TRANSMISSION》

| FILE NUMBER | COMMUNI- CATION DATA | COMMUNI- CATION START TIME | COMMUNI- CATION PARTNER | MESSAGES EXCHANGING MODE | COMMUNI- CATION TIME | NUMBER OF COMMUNI- CATION SHEETS | COMMUNI- CATION RESULT |
|---|---|---|---|---|---|---|---|
| 0111 | 99/05/22 | 09:05 | 1122223333 | G3EDM | 0'30" | 2 SHEETS | OK |
| 0114 | 99/05/23 | 12:15 | 9988776655 | G3ESM | 0'23" | 1 SHEET | OK |

《RECEIVING》

| FILE NUMBER | COMMUNI- CATION DATA | COMMUNI- CATION START TIME | COMMUNI- CATION PARTNER | MESSAGES EXCHANGING MODE | COMMUNI- CATION TIME | NUMBER OF COMMUNI- CATION SHEETS | COMMUNI- CATION RESULT |
|---|---|---|---|---|---|---|---|
| 0112 | 99/05/22 | 10:30 | 0123456789 | G3ES | 1'00" | 5 SHEETS | OK |
| 0113 | 99/05/23 | 08:12 | 9876543210 | G3S | 5'27" | 21 SHEETS | E |
| 0115 | 99/05/24 | 14:28 | 4455556666 | G3 | 0'14" | 0 SHEET | UC |

M: STORAGE  L: DESIGNATION OF TIME  S: NOMAL CHARACTER  D: SMALL CHARACTER  F: FINE CHARACTER

COMMUNICATION TERMINAL DEVICE, FACSIMILE DEVICE, AND A METHOD OF CONTROLLING COMMUNICATION TERMINAL DEVICE AND FACSIMILE DEVICE

BACKGROUND

1. Field of the Disclosure

The present disclosure relates to a communication terminal device and a facsimile device and, more specifically, a method of controlling the communication terminal device and the facsimile device.

2. Discussion of the Background

In a communication terminal device for use in a facsimile device, etc., when transmitting the message, a desired communication partner can be selected and data can be transmitted to the selected communication partner. However, when receiving a message, it is basically impossible to select the communication partner that the data is received from.

As a result, the facsimile receiver only knows if the message is received from a non-desirable communication partner after having received the message. Therefore, unnecessarily received or unwanted data may inevitably be received together with the necessary or desired data.

More specifically, in a facsimile device as an example, unwanted facsimile documents such as direct mail, for example, are often received from a business party who is not a daily communication partner. The direct mail is printed out on recording paper, thereby wasting recording paper. In addition, the unwanted document may get mixed together with one or more desired documents, thus requiring the receipt to sort through received documents. Consequently, receiving unwanted documents turns out to be troublesome.

For this reason, some background-art communication terminal devices have a function such that discrimination information (communication partner discrimination information) of the communication partner, that is, a sender sending a document desired to be received, is previously registered at the receiving terminal. Only when the communication partner discriminating information, which is communicated at the time of the message arrival, matches previously registered partner information, is the message arrival accepted. On the other hand, when the discriminating information does not correspond to that previously registered, the communication is forcibly ended and thereby wasteful message receipt is not performed.

In such communication terminal device provided with the function of rejecting the message, information relating to the receipt rejection is output as a notice report each time the message reception is rejected. For instance, refer to the published specification of Japanese Laid-open Patent Publication No. 3-205959.

SUMMARY OF THE INVENTION

A communication terminal device provided with a function of rejecting receipt of messages from communication partners other than communication partners previously registered in a receipt-allowed communication partner registration table, the communication terminal device comprising, a receipt rejecting communication control medium collecting communication control information in connection with a communication relating to a message arrival from a communication partner not registered in the receipt-allowed communication partner registration table and storing the collected communication control information in a signal-receiving rejecting communication control information storing medium. A communication control list creates medium creating a list of image information on the basis of the communication control information stored in the signal-receiving rejecting communication control information storage medium, and a list outputting medium visibly outputs the list of image information created by the communication control list creating medium.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a diagram (table) showing the concrete contents of the receipt-allowed communication partner registering table;

FIG. 6 is a diagram (table) showing the concrete contents of the communication control table;

FIG. 7 is a flow chart illustrating the procedure of the facsimile transmitting/receiving processes in the facsimile device relating to the embodiment;

FIG. 8 is a flow chart illustrating the procedure of the facsimile transmitting/receiving processes in the facsimile device relating to the embodiment, together with FIG. 7;

FIG. 10 is a diagram illustrating the communication control report example recorded and outputted in accordance with the processing procedure as shown in FIG. 9.

DETAILED DESCRIPTION OF THE PREFERRED EMBODIMENT

In describing the preferred embodiments illustrated in the accompanying drawings, specific terminology is employed for the sake of clarity. However, the present disclosure is not intended to be limited to the specific terminology so selected and it is to be understood that each specific element includes all technical equivalents which operate in a similar manner.

Figure 1:
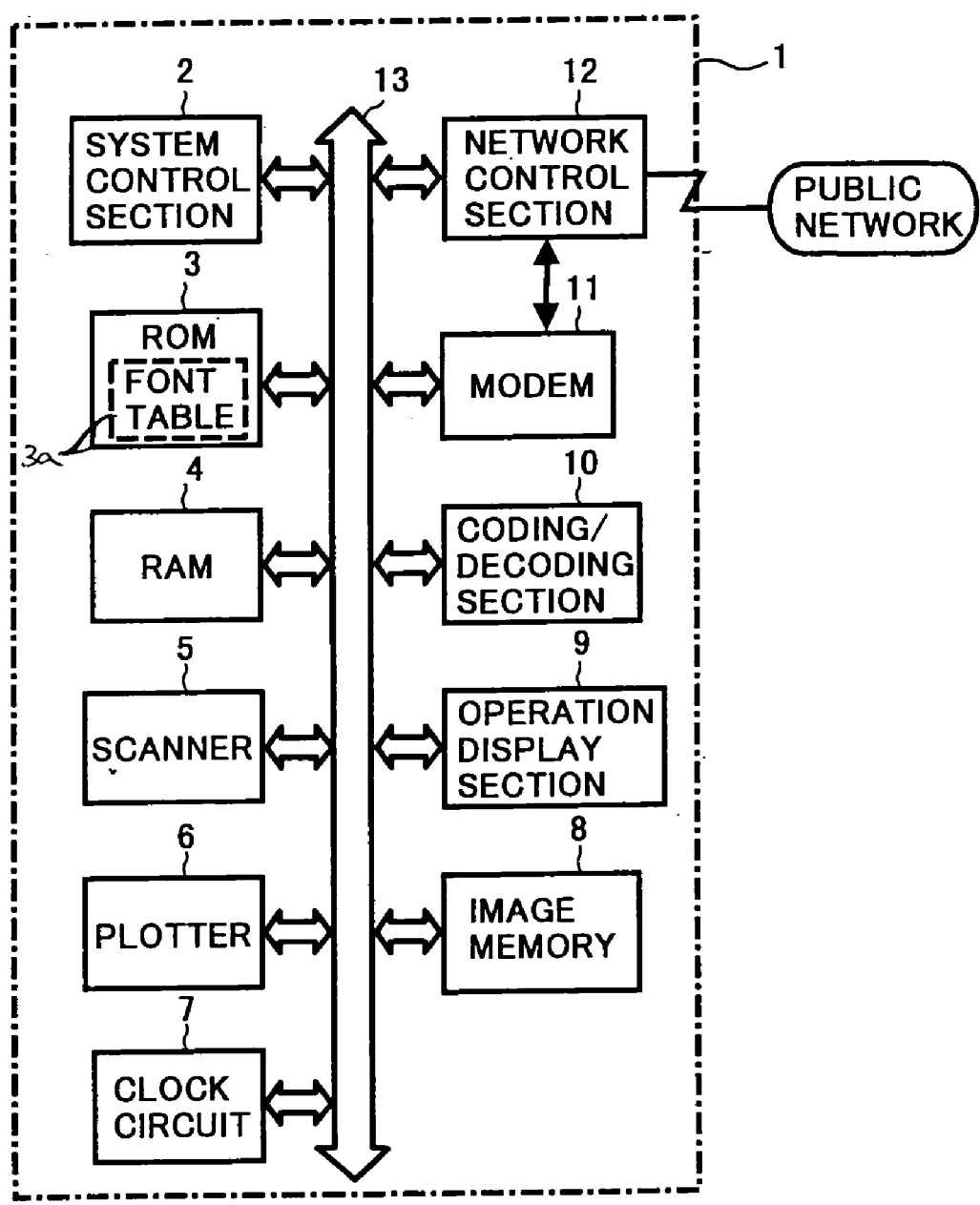
FIG. 1 is a block diagram illustrating the structure of a facsimile device relating to an embodiment.
Figure 2:
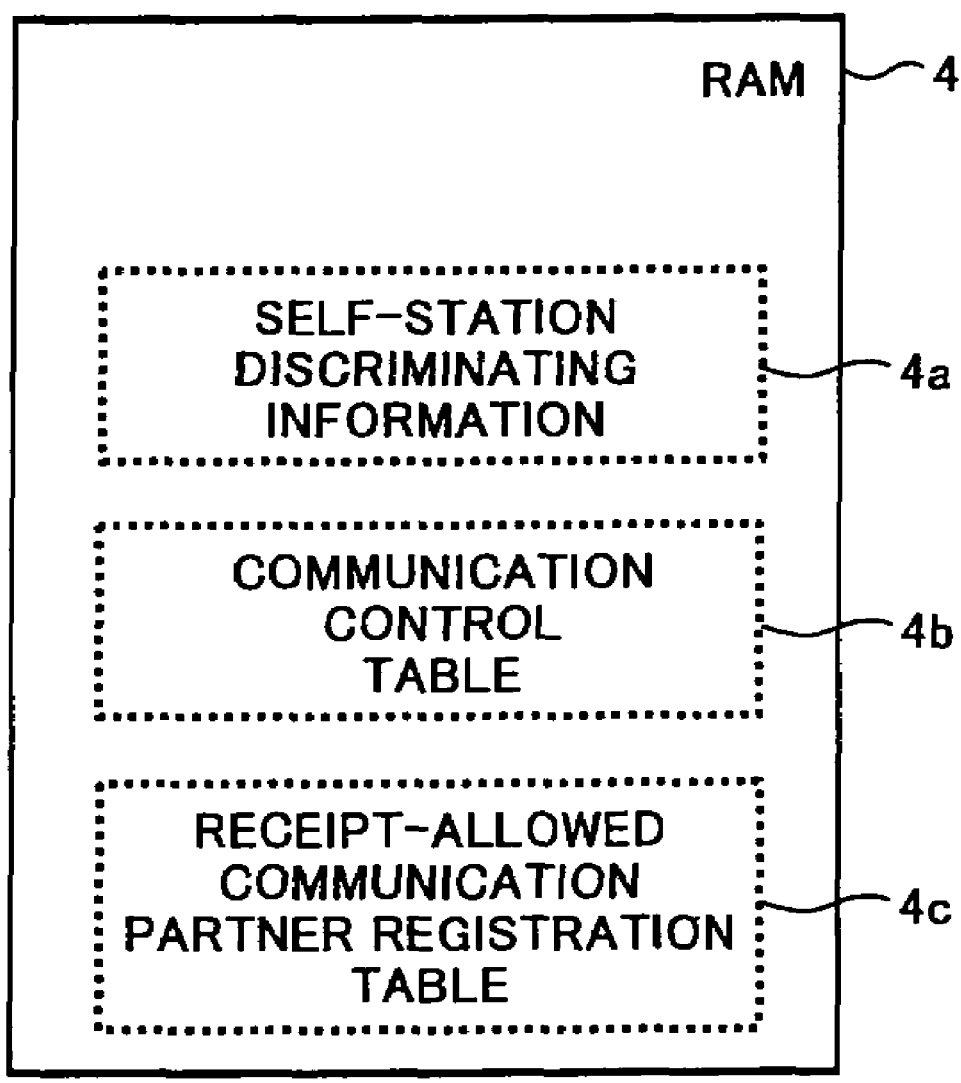
FIG. 2 is an explanatory diagram explaining the contents of the memorization in the RAM of the facsimile device relating to the embodiment.
Figure 3:
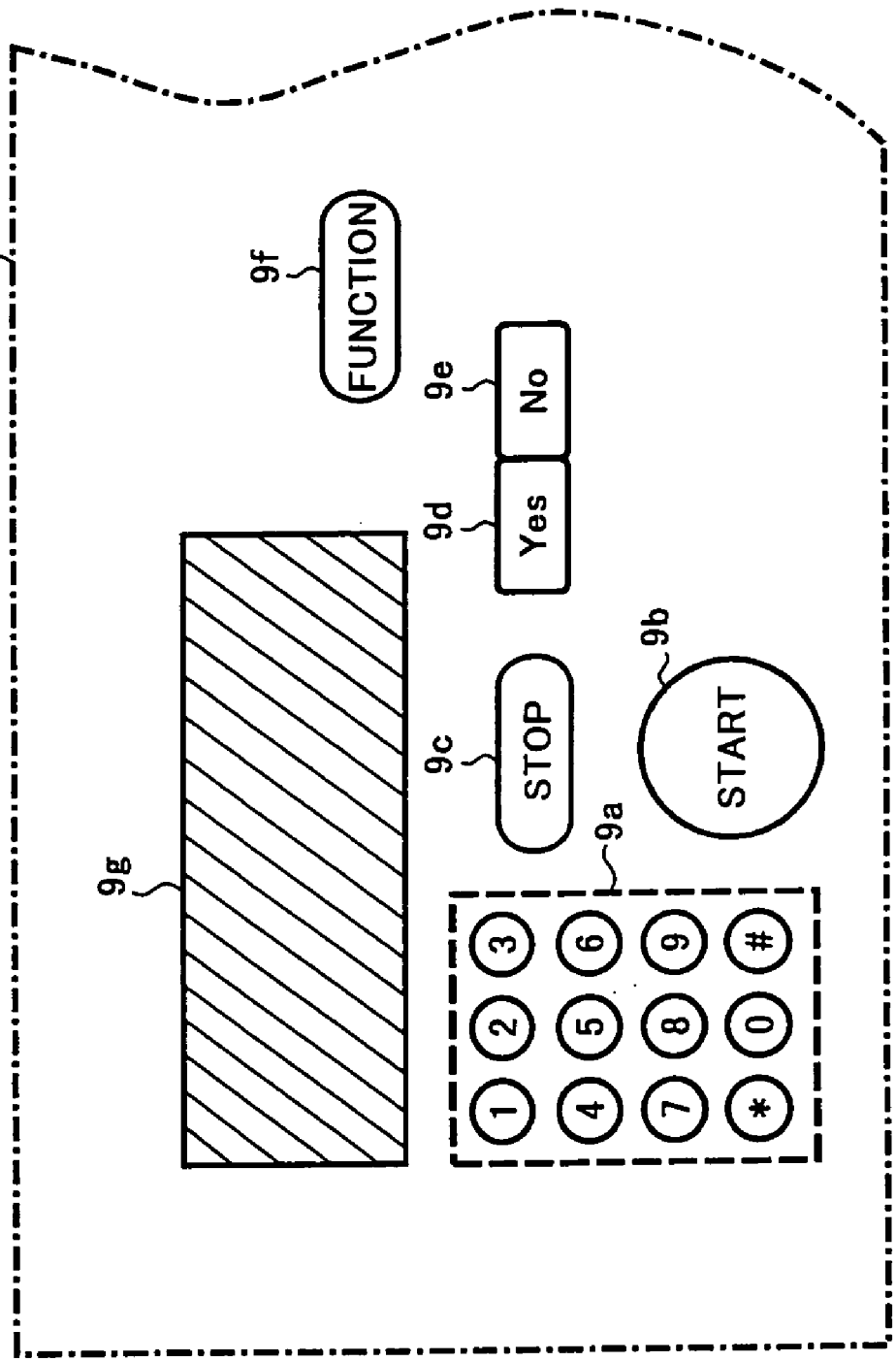
FIG. 3 is an arrangement view showing the operation board of the facsimile device relating to the embodiment, wherein the other parts excluding the part directly concerning the embodiment are omitted.
Figure 9:
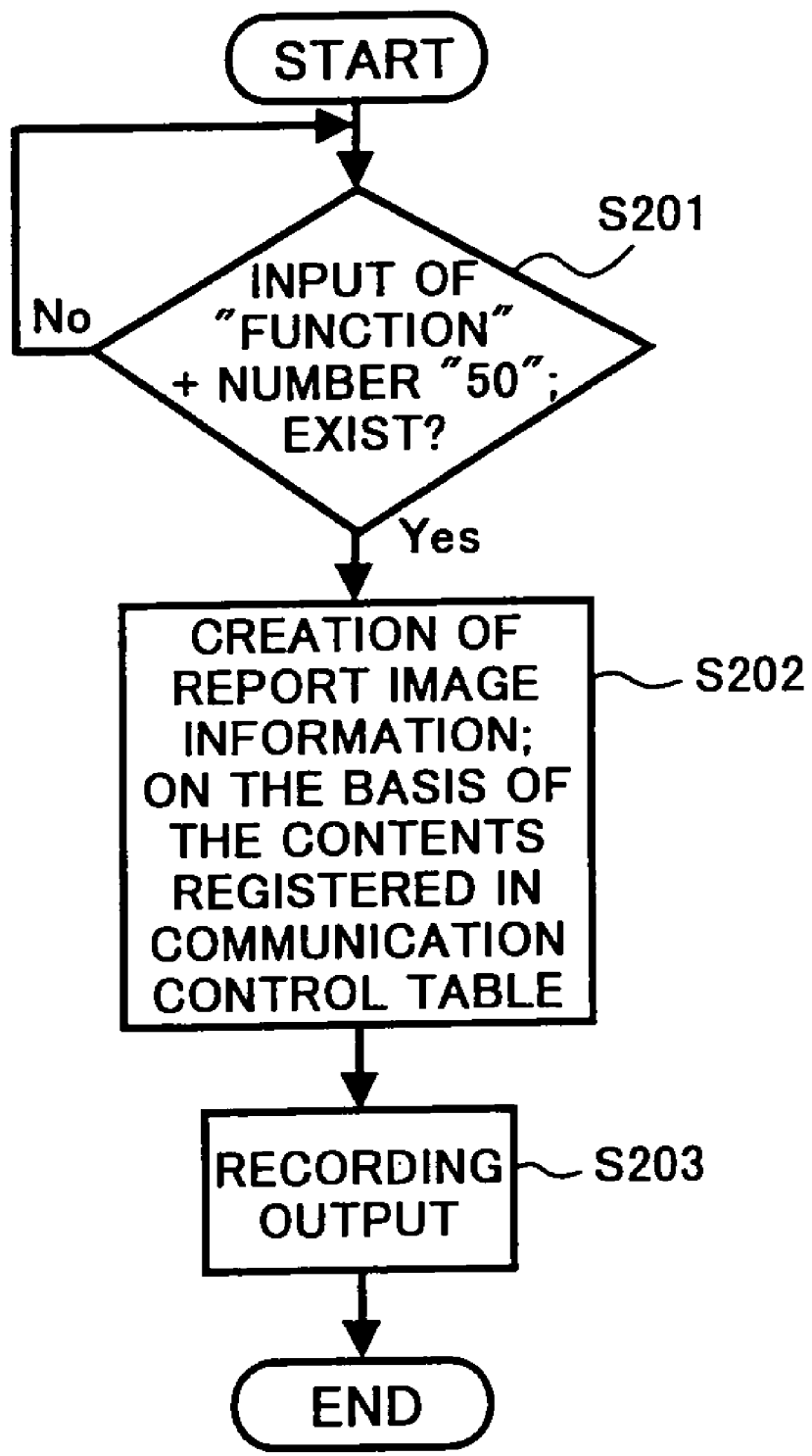
FIG. 9 is a flow chart illustrating the procedure of outputting the communication control report in the facsimile device relating to the embodiment.

Referring now to the drawings, wherein like reference numerals designate identical or corresponding parts throughout the several views (diagrams), and more particularly to FIGS. 1 through 3, thereof and FIGS. 7 through 9, there are illustrated a communication terminal device and the facsimile device according to an embodiment.

A first aspect of the present disclosure relates to a communication terminal device provided with a function of rejecting the receipt of messages from communication partners other than communication partners previously registered in a receipt-allowed communication partner registration table including:

a receipt rejecting communication control medium collection communication control information in connection with the communication relating to the message arrival from the communication partner not registered in the receipt-allowed communication partner registration table and storing the collected communication control information in a signal-receiving rejecting communication control information storage medium;

a communication control list creating medium creating a list image information on the basis of the communication control information stored in the signal-receiving rejecting communication control information storing medium; and a list outputting medium visibly outputting the list of image information created by the communication control list creating medium.

The second aspect of the present disclosure relates to a method of controlling a communication terminal device provided with a function of rejecting the receipt of messages from the other communication partners excluding the communication partner previously rejected in a receipt-allowed communication partner registration table including the steps of collecting communication control information in connection with the communication relating to the message arrival from the communication partner not registered in the receipt-allowed communication partner registration table and storing the collected communication control information in a signal-receiving rejecting communication control information storage medium; creating a list image information on the basis of the communication control information stored in the signal-receiving rejecting communication control information storage medium; and visibly outputting the created list image information.

The third aspect of the present disclosure relates to a communication terminal device provided with a function of rejecting the receipt of messages from the other communication partners excluding the communication partner previously registered in a receipt-allowed communication partner registration table including:

a normal communication control medium collecting communication control information in connection with the communication relating to the receipt of the message from the communication partner registered in a transmission-allowed communication partner registration table or the receipt-allowed communication partner registration table, and memorizing the collected communication control information in the normal communication control information memorizing medium; a receipt-rejected communication control medium collecting the communication control information in connection with the communication relating to the message arrival from the communication partner not registered in the receipt-allowed communication partner not registered in the receipt-allowed communication partner registration table and memorizing the corrected communication control information in a receipt-rejected communication control information memorizing medium; a communication control list creating medium creating the communication control list such that the list image information based on the communication control information respectively memorized in the normal communication control information memorizing medium and the receipt-rejected communication control information memorizing medium, and the communication control information in connection with the communication relating to the message arrival from the communication partner not registered in the receipt-allowed communication partner registering table can be discriminated from the communication control information in connection with the communication relating to the receipt of the messages from the communication partner registered in a transmission-allowed communication registering table; and a list outputting medium visibly outputting the list image information created by the communication control list creating medium.

The fourth aspect of the present disclosure relates to a method of controlling a communication terminal device provided with a function of rejecting the receipt of messages from the other communication partners excluding the communication partner previously registered in a receipt-allowed communication partner registration table including: the steps of:

collecting communication control information in connection with the communication relating to the receipt of the message from the communication partner registered in a transmission-allowed communication partner registration table or the receipt-allowed communication partner registration table, and memorizing the collected communication control information in the normal communication control information memorizing medium; collecting the communication control information in connection with the communication relating to the message arrival from the communication partner not registered in the receipt-allowed communication partner not registered in the receipt-allowed communication partner registration table; memorizing the corrected communication control information in a receipt-rejected communication control information memorizing medium; creating the communication control list such that the list image information based on the communication control information respectively memorized in the normal communication control information memorizing medium and the receipt-rejected communication control information memorizing medium, and the communication control information in connection with the communication relating to the message arrival from the communication partner not registered in the receipt-allowed communication partner registering table can be discriminated from the communication control information in connection with the communication relating to the receipt of the messages from the communication partner registered in a transmission-allowed communication registering table; and visibly outputting the list image information created by the communication control list creating medium.

The fifth aspect of the present disclosure relates to the communication terminal device in connection with the first or third aspect, in which the communication control information collected by the receipt-rejected communication control medium and memorized in the receipt-rejected communication control information memorizing medium in connection with the communication relating to the message arrival from the communication partner not registered in the receipt-allowed communication partner registering table includes the communication partner discriminating information notified at the time of the message arrival.

The sixth aspect of the present disclosure relates to the method of controlling the communication terminal device in connection with the second or fourth aspect, in which the communication control information memorized in the receipt-rejected communication control information memorizing medium in connection with the communication relating to the message arrival from the communication partner not registered in the receipt-allowed communication partner registering table includes the communication partner discriminating information notified at the time of the message arrival.

The seventh aspect of the present disclosure relates to the communication terminal device in connection with the first, third, or fifth aspect, in which the communication terminal device further comprises a time counting medium for counting the present date and time; and in which the communication control information collected by the receipt-rejected communication control medium and memorized in the receipt-rejected communication control information memorizing medium in connection with the communication relating to the message arrival from the communication partner not registered in the receipt-allowed communication partner registering table includes the date-and-time information read out from the time counting medium at the time of the message arrival.

The eighth aspect of the present disclosure relates to the communication terminal device in connection with the second, fourth, or sixth aspect, in which the communication control information memorized in the receipt-rejected communication control information memorizing medium in connection with the communication relating to the message arrival from the communication partner not registered in the receipt-allowed communication partner registering table includes the date-and-time information at the time of the message arrival.

The ninth aspect of the present disclosure relates to a facsimile device provided with a receipt-rejected function of rejecting the message receipt from the communication partner excluding the communication partner previously registered in a receipt-allowed communication partner registered in a receipt-allowed communication partner registering table including: a receipt-rejected communication control medium collecting the communication control information in connection with the communication relating to the message arrival from the communication partner not registered in the receipt-allowed communication partner registering table, and memorizing the collected communication control information in the receipt-rejected communication control information memorizing medium; a communication control list creating medium creating the list image information on the basis of the communication control information memorizing in the receipt-rejected communication control information memorizing medium; and a list outputting medium visibly outputting the list image information created by the communication control list creating medium.

The tenth aspect of the present disclosure relates to a method of controlling the facsimile device provided with a receipt-rejected function of rejecting the message receipt from the communication partner excluding the communication partner previously registered in a receipt-allowed communication partner registered in a receipt-allowed communication partner registering table including the steps of: collecting the communication control information in connection with the communication relating to the message arrival from the communication partner not registered in the receipt-allowed communication partner registering table; creating the list image information on the basis of the communication control information; memorizing the collected communication control information in the receipt-rejected communication control information memorizing medium; creating the list image information on the basis of the communication control information memorized in the receipt-rejected communication control information memorizing medium; and visibly outputting the created list image information.

The eleventh aspect of the present disclosure relates to a facsimile device provided with a receipt-rejected function of rejecting the message receipt from the communication partner excluding the communication partner previously registered in a receipt-allowed communication partner registered in a receipt-allowed communication partner registering table including a normal communication control medium collecting the communication control information in connection with the communication relating to the message receipt from the communication partner registered in the transmission-allowed communication partner registering table or in the receipt-allowed communication partner registering table and memorizing the collected communication control information in the normal communication control information memorizing medium; a receipt-rejected communication control medium collecting the communication control information in connection with the communication relating to the message arrival from the communication partner not registered in the receipt-allowed communication partner registering table, and memorizing the collected communication control information in the receipt-rejected communication control information memorizing medium; a communication control list creating medium creating the list image information on the basis of the communication control information respectively memorized in the normal communication control information memorizing medium and the receipt-rejected communication control information memorizing medium and creating the communication control information in connection with the communication relating to the message arrival from the communication partner not registered in the receipt-allowed communication partner registering table, such that both of the communication control information can be discriminated from the communication control information in connection with the communication relating to the message receipt from the communication partner registered in the transmission communication partner registering table or in the receipt-allowed communication partner registering table; and a list outputting medium visibly outputting the list image information created by the communication control list creating medium.

The twelfth aspect of the present disclosure relates to a method of controlling a facsimile device provided with a receipt-rejected function of rejecting the message receipt from the communication partner excluding the communication partner previously registered in a receipt-allowed communication partner registered in a receipt-allowed communication partner registering table including the steps of: collecting the communication control information in connection with the communication relating to the message receipt from the communication partner registered in the transmission-allowed communication partner registering table or in the receipt-allowed communication partner registering table; memorizing said collected communication control information in the normal communication control information memorizing medium; collecting the communication control information in connection with the communication relating to the message arrival from the communication partner not registered in the receipt-allowed communication partner registering table; memorizing the collected communication control information in the receipt-rejected communication control information memorizing medium; creating the list image information on the basis of the communication control information respectively memorized in the normal communication control information memorizing medium and the receipt-rejected communication control information memorizing medium and creating the communication control information in connection with the communication relating to the message arrival from the communication partner not registered in the receipt-allowed communication partner registering table, such that both of the communication control information can be discriminated from the communication control information in connection with the communication relating to the message receipt from the communication partner registered in the transmission communication partner registering table or in the receipt-allowed communication partner registering table; and visibly outputting the list image information created by the communication control list creating medium.

The thirteenth aspect of the present disclosure relates to the facsimile device provided with a receipt-rejecting function in connection with the ninth or eleventh aspect, in which the communication control information collected by the receipt-rejected communication control medium and memorized in the receipt-rejected communication control information memorizing medium in connection with the communication relating to the message arrival from the communication partner not registered in the receipt-allowed communication partner registering table includes a communication partner identifying information.

The fourteenth aspect of the present disclosure relates to the method of controlling the facsimile device provided with a receipt-rejecting function in connection with the tenth or twelfth aspect, in which the communication control information collected by the receipt-rejected communication control medium and memorized in said receipt-rejected communication control information memorizing medium in connection with the communication relating to the message arrival from the communication partner not registered in the receipt-allowed communication partner registering table includes a communication partner identifying information.

The fifteenth aspect of the present disclosure relates to the facsimile device provided with a receipt-rejecting functions in connection with the ninth, eleventh, or thirteenth aspect further comprising a time counting medium for counting the present date and time, in which the communication control information collected by the receipt-rejected communication control medium and memorized in the receipt-rejected communication control information memorizing medium in connection with the communication relating to the message arrival from the communication partner not registered in the receipt-allowed communication partner registering table includes the date-and-time information read out from the time counting medium at the time of the message arrival.

The sixteenth aspect of the present disclosure relates to the method of controlling the facsimile device provided with a receipt-rejecting function in connection with the tenth, twelfth, or fourteenth aspect further comprising the steps of: counting the present date and time by use of a time counting medium; collecting the communication control information by use of the receipt-rejected communication control medium; and memorizing the collected communication control information in the receipt-rejected communication control information memorizing medium in connection with the communication relating to the message arrival from the communication partner not registered in the receipt-allowed communication partner registering table so as to include the date-and-time information read out from the time counting medium at the time of the message arrival.

An embodiment of the present disclosure is described hereinafter in detail, referring to the accompanying drawings.

FIG. 1 shows the block structure of the facsimile device 1 as the communication terminal device relating to an embodiment of a present disclosure.

In FIG. 1, the facsimile device 1 is constructed with a system control section 2, a ROM 3, a RAM 4, a scanner 5, a plotter 6, a clock circuit 7, an image memory 8, an operation display section 9, a coding/decoding section 10, a MODEM 11, a network control section 12, and a system bus 13.

The system control section 2 employs the RAM 4 as a working area and controls the respective sections in the facsimile device 1 in accordance with the control program written in the ROM 3.

ROM 3 is a read only memory in which the control program(s) for the system control section 2 used to control the respective sections of the facsimile device are stored. A font table 3a causing the respective character codes to correspond to the font data is stored in the ROM 3. In the case of converting the character row to image information, the system control section 2 allocates the font table 3a.

As mentioned before, the RAM 4 is a random access memory employed as a working area of the system control section 2. The RAM 4 can be backed-up by a back-up circuit not shown, and the stored contents held even when the power source of the facsimile device is turned off. Furthermore, as shown in FIG. 2, self-station discriminating information 4a, a communication control table 4b, a receipt-allowed communication partner registering table 4c are also stored and registered respectively in the RAM 4.

The self-station discriminating information 4a is information identifying the device when it transmits to a communication partner's device. This information is communicated to the communication partner's device as a transmission terminal discriminating signal TSI or as a called terminal discriminating signal CSI in the pre-transmission procedure of the G3 facsimile protocol. Usually, the facsimile number of the sending station itself is registered therein. The communication control table 4b and the receipt-allowed communication partner registering table will be described later.

The scanner 5 reads out an original document image with a predetermined line density such as 3.85 lines/mm, 7.7 lines/mm, and 15.4 lines/mm, and obtains the image information. Plotter 6 records and outputs the received image information in accordance with the line density, or records and outputs (copies) the image information read out by the scanner 5 in accordance with the line density.

The clock circuit 7 counts the present date and time. The system control section 2 can obtain the present date and time by reading it from the clock circuit 7. The image memory 8 is used for developing the image information when the transmitting/receiving image information is temporarily stored (accumulated) or when the various sorts of report image information is created.

The operation display section 9 is provided with a ten-key pad for designating the facsimile number of the communication partner, a start key, a one-touch dial key, and various other keys, and may include a displaying unit such as liquid crystal displaying device (LCD). The LCD displays the operation state of the device to the user along with various types of messages.

FIG. 3 shows an example of the arrangement of the operation display section 9, with parts not necessary for an understanding of the embodiment of the present disclosure being omitted in FIG. 3. The ten-key pad 9a is used to directly designate the facsimile number, etc. of the communication partner. The start key 9b is used to indicate the start of the facsimile transmission operation and the start of the copying operation. The stop key 9c is used to forcibly stop the various operations. The "Yes" key 9d and the "No" key 9e allow the user to perform various selections for making a decision or to cancel an operation.

The function key 9f is used for calling out (carrying out) the registering function of the one-touch dial, the registering function of the shortening dial, the function of setting the user parameter, and other functions excluding the standard facsimile function of the facsimile device 1 such as the time designating transmission, the department code designating transmission, etc. After selecting the function key 9f, the numbers corresponding to the respective functions are inputted. Thereby, the respective functions can be called out and performed.

The display unit 9g displays the operation state of the device to the user and the various other messages.

In FIG. 1, the coding/decoding section 10 performs the operation of coding/compressing the transmitted image data using a predetermined coding method suitably matched to the G3 facsimile such as an MH coding method, an MR coding method, and an MMR coding method, etc. In addition, the same section 10 performs the operation of decoding/expanding received image data using a predetermined decoding method such the MH coding method, the MR coding method, and the MMR coding method, etc. The MODEM 11 is a G3 facsimile MODEM and modulates the data transmitted to a public network through the network control section 12. Furthermore, the MODEM 11 also sends out a DTMT signal corresponding to the inputted dial number. The network control section 12 is connected to the public network and closes and releases the DC loop of the circuit, performs a control of the connection to the circuit of the detection of the polarity inversion of the circuit, the circuit release detection, the transmitted sound detection, the detection of the tone signal of the busy tone, etc., and the calling signal, and creates the dial pulse. The system bus 13 is a bus signal line for the above respective parts to exchange the data.

Figure 4:
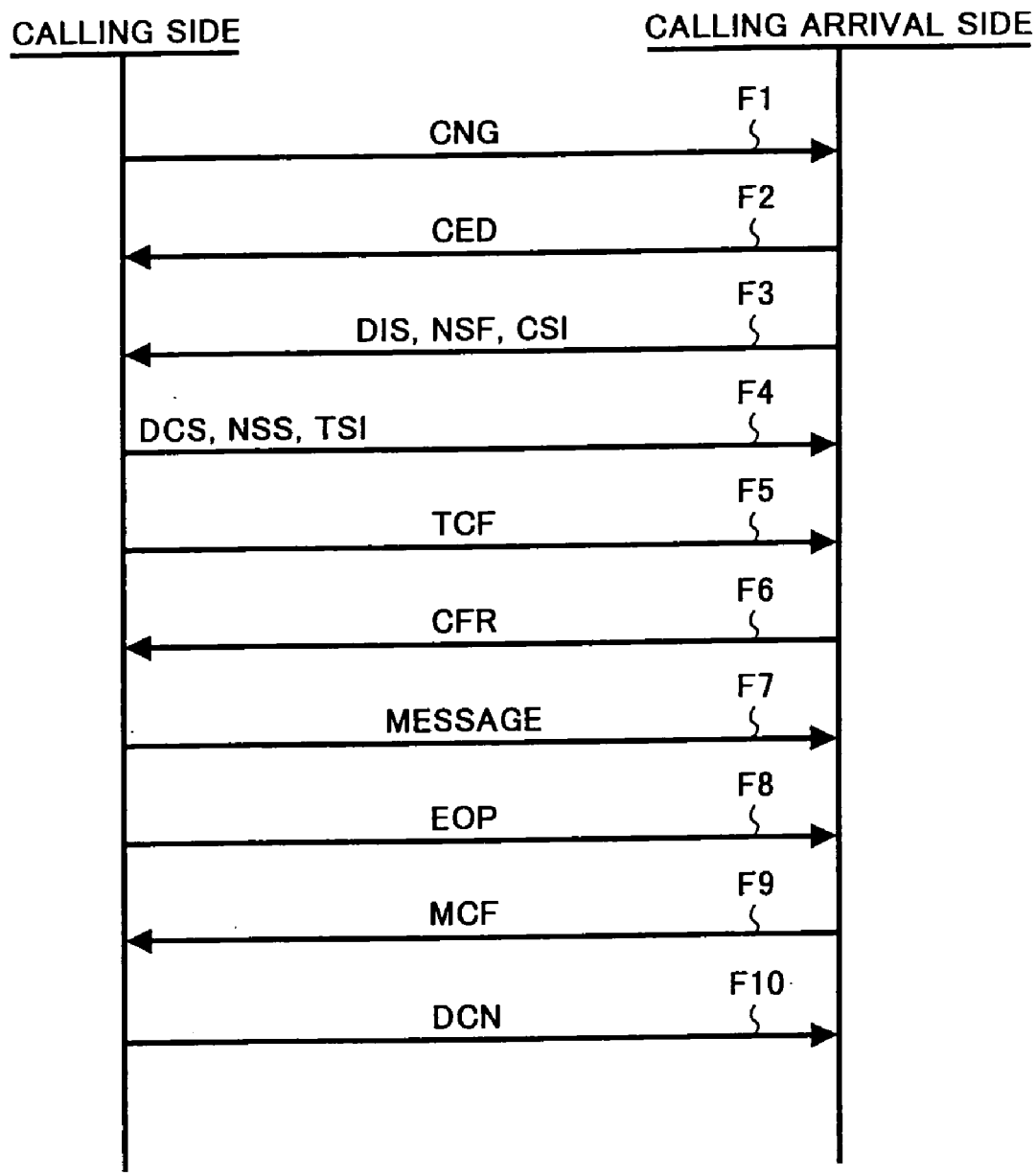
FIG. 4 is a sequence diagram illustrating the facsimile transmission sequence.

The general communication sequence in the G3 facsimile will now be described by reference to FIG. 4.

When the calling side calls the communication partner device at the message reception side, a circuit is established. The calling tone CNG indicates the "calling" step (phase F1). The called (calling receipt) side responds to the "calling" step by returning its called station discriminating signal CED (phase F2).

The called side also returns its digital discrimination signal DIS, a non-standard function signal NSF and a called terminal discriminating signal CSI in phase F3.

The calling side then sends out a digital sending order signal DCS, a non-standard function setting signal NSS, and a transmission terminal discriminating signal TSI, for the digital discrimination signal DIS, the non-standard function discriminating signal NSF, and the called terminal discriminating signal CSI (phase F4).

Furthermore, the calling side sets communication parameters with the phase F4, and thereafter, performs MODEM training with the set MODEM speed (phase F5). The calling side then waits for receipt of the receipt preparing confirmation signal CFR from the called (message receipt) side (phase F6), and then transmits the image information as the facsimile message (phase F7). The data transmitted as the facsimile message during the phase F7 is not limited to image information. That is, the facsimile message may be transmitted as is binary data of a BFT (Binary File Transfer) which is an expanded function of the G3 facsimile.

After the facsimile message has been transmitted during the phase F7, the calling side sends out the procedure ending signal EOP (phase F8). When the called side (message receipt side) responds with signal MCF (phase F9), the calling side sends out the cut-off or disconnect ordering signal DCN (phase F10). At this time, the facsimile transmission is completed.

The G3 facsimile communication is performed in such a way that the called terminal discrimination signal CSI is sent during Phase F3. The calling side can thus obtain the discrimination information of the communication partner during phase F3. On the other hand, the called side can obtain the discrimination information of the communication partner at the calling side from the transmission terminal discrimination signal TSI sent during Phase F4. The information being exchanged, for example, the called terminal discrimination signal CSI and the transmission terminal discrimination signal TSI are the self-station discriminating information 4a previously registered and stored in the RAM 4 as mentioned above.

The contents of the receipt-allowed communication partner registering table 4c registered and stored in the RAM 4 is shown in FIG. 5. The discriminating information of the receipt-allowed communication partners is registered in the receipt-allowed communication partner registering table 4c as shown in FIG. 5. The discriminating information of the respective communication partners which is registered, is the same as the discriminating information notified from the respective communication partners with the transmission terminal discriminating signal TSI at the time of receiving the signal.

FIG. 6 shows the contents of the communication control table 4b registered and stored in the RAM 4.

In FIG. 6, the communication control table 4b is constructed as a collection of communication control information records corresponding to the record number of the respective communications.

The respective communication control information records are constructed with the respective fields; such as "file number" attached to distinguish the respective cases of the communication of transmitting or receiving the message; "transmitting/receiving" showing either one of the communication types (transmission or receipt); "communication date" showing the date of performing the respective communications; "communication starting time" showing the time point of starting the respective communications; "communication partner" showing the discriminating information of the communication partner obtained by the called terminal discriminating signal CSI of the G3 facsimile protocol, the calling terminal discriminating signal CIG, and the transmission terminal discriminating signal TSI, etc.; "messages exchanging mode" showing the signal exchanging mode at the time of communicating with the communication partner; "communicating time" showing the time consumed during the communication; "communication pages number" showing the number of pages of the communicated image information; and "communication result" showing the normal completion of the communication (OK), the non-completion (abnormal state) of the communication (E), or the occasional receipt rejection (rejection of receiving the signal) (UC). Furthermore, the character row "G3" shows the exchanging of the signal with the G3 facsimile protocol. The character "E" shows the exchanging of the signal by jointly utilizing the ECM (Error Correcting Mode) which is an additional function of the G3 facsimile protocol. The characters "S", "D", and "F" respectively show the line densities of the transmitted or received image information;

3.85 lines/mm (ordinary character), 7.7 lines/mm (small character), and 15.4 lines/mm (fine character). The character "M" shows the performance of a memory transmission or a memory reception. The "UC" at the "communication result" is the abbreviation indicating an "Unauthorized Call".

Next, the procedure of processing the facsimile transmission/receipt performed in the facsimile device 1, will be described by referring to FIG. 7 and FIG. 8.

In FIG. 7, the signal arrival is detected by the network control section 12, and the system control section 2 of the facsimile device 1 monitors whether the original document is set on the scanner 5 (loop of the judgment 101-No and the judgment 102-No).

When the signal arrives (judgment 101-Yes), the present date and time are read out as the communication starting date and time from the clock circuit 7 (process 103). The operation of counting the communication time is started (process 104), and then the pre-transfer (pre-transmission) procedure is practiced on the basis of the G3 facsimile protocol responding to the signal arrival (process 105). In the pre-transfer procedure of the process 105, the transmitter (sender) discriminating information is received as the transmitting terminal discriminating signal TSI.

Here, the transmitter discriminating information is collated with the receipt-allowed communication partner registering table 4c (process 106). As the result, when the transmitter discriminating information received at the process 105 is registered in the table 4c (judgment 107-Yes), the transferring (transmission) control procedure the G3 facsimile protocol procedure which follows thereafter is continued, and then the facsimile signal-receiving process of receiving the facsimile message is performed (process 108).

When the facsimile signal-receiving process is completed normally (judgment 109-Yes), the result of the communication relating to the relevant facsimile signal-receiving is made "OK" (process 110). On the other hand, when a communication error occurs during the facsimile signal receiving process and thereby the process cannot be completed normally (judgment 109-No), the result of the communication relating to the relevant facsimile signal receiving is made "E" (process 114).

In the judgment 107, when the transmitter (sender) discriminating information received in the process 105 is not registered in the table 4c (judgment 107-No), the circuit is forcibly cut off and the communication is stopped (process 112), and then the result of the communication relating to the relevant facsimile signal arrival is made "UC" (process 113).

After performing the process 110, the process 114 or the process 113, the communication control information regarding the communication arriving at this time is made and registered in the communication control table 4b (process 111). Regarding the communication control information made and registered at the process 111, as shown in FIG. 6, a file number that is not duplicative with one already attached to one of the other communication control information records, is registered as the field "file number". Furthermore, the "signal receipt" is registered as the field "transmission/receipt". The communication starting date read out in the process 103 is registered. The communication starting time read out in the process 103 is registered as the field "communication starting time". The transmitter (sender) discriminating information received in the pre-transferring (pre-transmission) procedure of the process 105 is registered as the field "communication partner". As to the field "signal exchanging mode", when the judgment 107 becomes Yes and the facsimile signal receiving process is performed, the property of the practical facsimile message receipt is registered, in addition to "G3". However, when the judgment 107 becomes No and the facsimile signal receiving process is not performed, only the "G3" is registered. Furthermore, as to the field "communication time", the accumulated counted time of the communication time, started in the process 104 until the circuit is cut off, is registered. Furthermore, as to the field "communication sheets number", when the judgment 107 becomes Yes and the facsimile signal receiving process is performed, the number of pages of the received image information is registered. However, when the judgment 107 becomes No and the facsimile signal receiving process is not performed, the sheets number "0" is registered. Furthermore, as to the field "communication result", when the judgment 107 becomes Yes and the facsimile signal receiving process is performed, "OK" or "E" is respectively registered in accordance with whether the facsimile signal receiving process is normally completed or not. However, when the judgment 107 becomes No and the facsimile signal receiving process is not performed, the "UC" showing the receipt rejection is registered.

Now, in the judgment 102, when the original document is set (judgment 102-Yes), whether there exists a designation input to the address via the operation board 9 is monitored (judgment 115-No loop) (see FIG. 8). When the designation inputting is performed to the address (judgment 115-Yes), whether the start key 9b indicating the transmission start is pushed down is further monitored (judgment 116-No loop). When the start key 9b is pushed down and the transmission start is indicated (judgment 116-Yes), the present date and time are read out from the clock circuit 7 as the communication start date and time (process 117) and the counting of the communication time is started (process 118). The calling is done to the address designated at the judgment 115 and the pre-transmission procedure is practiced on the basis of the G3 facsimile protocol (process 119). In the pre-transmission procedure of the process 119, the self station discriminating information 4a is transmitted as the transmission terminal discriminating signal TSI.

The transmission control procedure is continued on the basis of the G3 facsimile protocol thereafter, and the facsimile signal transmitting process of sending, as the facsimile message, the image information obtained by reading out the original document set in the judgment 102 is performed (process 120). When the facsimile signal transmitting process is normally completed (judgment 109-Yes), the result of the communication relating to the relevant facsimile transmission is made "OK" (process 112). On the other hand, when the communication error occurs during the facsimile signal transmitting process and the transmitting process is not normally completed (judgment 121-No), the result of the communication relating to the relevant facsimile transmission is made "E" (process 123).

After performing the process 122 or the process 123, the communication control information regarding the communication transmitted this time is created and the information thus created is registered in the communication control table 4b (process 124). Regarding the communication created and registered in the process 124, a file number that is not duplicative with one already attached to a record of the other communication control information is registered as the field "file number" as shown in FIG. 6.

Furthermore, the "signal receipt" is registered as the field "transmission/receipt". The communication starting date read out in the process 117 is registered in the field "communication date". The communication starting time read out in the process 118 is registered as the field "communication starting time". The discriminating information at the signal receiving side received in the pre-transmission procedure of the process 119 is registered as the field "communication partner". The property of the practical facsimile message receiving is registered in addition to the "G3" as the field "signal exchanging mode". Furthermore, as to the field "communication time", the accumulated counted time between cutting off the circuit of the communication, and starting the time of the communication as started in the process 118, is registered. The number of pages of the transmitted image information is registered as the field "communication sheets number". The "OK" or "E" is registered in accordance with the facsimile signal transmitting process is normally completed as the field "communication result".

In such way as mentioned heretofore, the communication control information relating to the signal arrival from the receipt-rejected communication partner which is not registered in the receipt-allowed communication partner registering table 4c is registered in the communication control table 4b together with the normal communication control information relating to the signal transmission and the signal receipt from the communication partner registered in the receipt-allowed communication partner registering table 4c.

In fact, it may be allowable that the receipt-rejected communication control information relating to the signal arrival from a receipt-rejected communication partner is registered in another table different than that of the ordinary communication control information relating to the signal transmission and the signal receipt from the communication partner registered in the receipt-allowed communication partner registering table 4c. However, although the receipt-rejected communication control information is registered in the communication control table 4b together with the normal communication control information, either one of the types of communication control information can be easily discriminated according to whether the "UC" is registered in the field "communication result". Therefore, in the present embodiment, the receipt-rejected communication control information is registered in the communication control table 4b together with the normal communication control information. By jointly employing the communication control table in such a way, the receipt-rejected communication control information can be treated in a similar way to that of the normal communication control information. Consequently, a control of the communication control information can be easily maintained.

Next, the procedure of the communication control report outputting process in the facsimile device 1 is described hereinafter, referring to FIG. 9.

In FIG. 9, when the "FUNCTION" key 9f is selected via the operation displaying section 9, the system control section 2 monitors whether an operation of inputting the number "50" by use of the ten-key pad 9a has been performed indicating, for example, whether the communication control report outputting mode is initiated (judgment 201-No loop). When the communication control report outputting mode is initiated (judgment 201-Yes), the report image information is created on the basis of the registered contents of the communication control table 4b (process 202). The report image information thus created is recorded and outputted on the recording paper by use of the plotter 6 and thereby the report image information can be visibly outputted (process 203). On that occasion, it may be allowable that the visible output state of the report image information is the display on the operation displaying section 9.

FIG. 10 shows the example of the communication control report recorded and outputted on the recording paper in the process 203 of FIG. 9.

The content of the report as shown in FIG. 10 is shown in the style of a list classifying the registered contents of the communication control table 4b into the "transmission" and the "receipt". The communication control information regarding the communication relating to the receipt rejection of the communication result "UC" is noted in the communication result section.

As described heretofore, the communication control information regarding the communication relating to the receipt rejection is provided in the form of the list such that the above communication control information can be distinguished from other normal communication control information relating to transmission and receipt. This is contrast to the case in which a report regarding a communication relating to the receipt rejection is outputted as a one-page report for each receipt rejection. Accordingly, in the present system, the wasteful paper usage can be avoided. Furthermore, the communication control information of the communication relating to the receipt rejection can be collectively controlled together with the communication control information relating to normal transmissions or receptions.

It is also possible to treat the communication control information regarding the communication relating to the receipt rejection different than the communication control information relating to the normal transmission or reception, for instance, by recording and outputting the information as a receipt-rejected communication control report. In this case, the receipt-rejected communication control report can be outputted as one sheet of report. Therefore, the communication control information relating to the receipt-rejected communication can all be controlled separate from the communication control information relating to ordinary communications.

Furthermore, regarding the contents of the communication control information in connection with the communication relating to the receipt rejection, since the communication partner discriminating information to be notified at the time of the signal arrival is included therein, when a large number of receipt rejections occur, the receipt-rejecting communication partner can be easily specified. Furthermore, regarding the contents of the communication control information relating to the receipt rejection, since the communication starting time is included therein, the time of the receipt-rejected signal arrival can also be easily specified.

In the embodiment mentioned heretofore, the present disclosure is applied to a facsimile device which is a communication terminal device. However, the present disclosure is not limited thereto. The disclosure is similarly applicable to any type of communication terminal apparatus in which the discriminating information of the transmitter (sender) is notified at the time of the signal arrival.

Regarding the communicating state of notifying the discriminating information of the communication partner at the time of the signal arrival, the communicating state in which the network itself is provided with the notifying function of the transmitter (sender) discriminating information such as the transmission number notifying service provided in the public telephone network can be considered, in addition to the communication state of notifying the information from the transmitter's (sender's) apparatus by use of the communication protocol.

Furthermore, the present disclosure is also applicable to a communication state in which the email address of the transmitter (sender) is notified at the time of receiving the electronic mail, such as exchanging of data utilizing electronic mail through a network such as the Internet, etc.

According to a first or second aspect of the present disclosure, in a communication terminal device, the communication control information in connection with the communication relating to the receipt-rejected signal arrival is not outputted with a separate page for each receipt rejection. Instead, the communication control information is collectively outputted as a list. Therefore, information in connection with the communication relating to the receipt rejection can be controlled. Consequently, the handling of the device can be made easy.

According to a third or fourth aspects of the present disclosure, in a communication terminal device, communication control information in connection with communication relating to the receipt-rejected signal arrival is not outputted with separate different pages per each communication relating to the receipt rejection. Instead, the above communication control information is collectively outputted as a list together with the communication control information in connection with the normal communication excluding the communication relating to the receipt-rejected signal arrival.

Consequently, not only the information in connection with the communication relating to the receipt rejection can be collectively (concentratedly) controlled and thereby the handling thereof can be easily done, but both of the information of the normal communication and the information of the receipt-rejected communication can be united and controlled.

According to a fifth or sixth aspect of the present disclosure, in a communication terminal device, the communication control information in connection with the communication relating to the communication partner not registered in the aforementioned receipt-allowed communication partner registering table includes the communication partner discriminating information notified at the time of the signal arrival.

Consequently, when a large number of receipt rejections occur, the specialization of the receipt-rejected communication partner(s) can be easily done.

According to a seventh or eighth aspect of the present disclosure, in the communication terminal device, the communication control information in connection with the communication relating to the communication partner not registered in the aforementioned receipt-allowed communication partner registering table includes the date and time information read out for the aforementioned time counting medium at the time of the signal arrival.

Consequently, the time when the signal arrives can be easily specified. This is still another advantageous functional effect which can be obtained by the present disclosure.

According to the ninth or tenth aspect of the present disclosure, in the facsimile device, the communication control information in accordance with the communication relating to the receipt-rejected signal arrival is not outputted with the separated different pages per each communication relating to the receipt rejection of the respective cases. Instead, the above communication control information is outputted in the gross as the list. Consequently, the information in connection with the communication relating to the receipt rejection can be concentratedly controlled and thereby the handling thereof can be done easily.

Furthermore, when the list of the communication control information in connection with the communication relating to the receipt-rejected signal arrival is recorded and outputted on the recording paper and thereby the wasteful usage of the recording paper can be avoided as the merit of the invention, compared with the case in which the communication control information in connection with the communication relating to the case-by-case receipt-rejected signal arrival is respectively printed on the different pages of the recording paper.

The above-mentioned matter is still another advantageous functional effect which can be obtained by the present disclosure.

According to the eleventh or twelfth aspect of the present disclosure, in the facsimile device, the communication control information in connection with the communication relating to the receipt-rejected signal arrival is not outputted with the separated different pages per each communication relating to the receipt rejection of the respective cases. Instead, the above communication control information is outputted in the gross as the list together with the communication control information in connection the normal communication excluding the communication relating to the receipt-rejected signal arrival.

Furthermore, when the communication control information in connection with the communication relating to the receipt-rejected signal arrival is recorded and outputted on the recording paper as the list together with the communication control information in connection with the normal communication and thereby the visible outputting can be enabled, the wasteful usage of the recording paper can be further avoided, compared with the case in which the list of the communication control information in connection with the normal communication is outputted as the communication control information, and in addition the communication control information in connection with the communication relating to the case-by-case receipt-rejected signal arrival is respectively printed on the different pages of the recording paper.

The above-mentioned matter is still another advantageous functional effect which can be obtained by the present disclosure.

According to the thirteenth or fourteenth aspect of the present disclosure, in the facsimile device, the communication control information in connection with the communication relating to the signal arrival from the communication partner not registered in the aforementioned receipt-allowed communication partner registering table includes the communication partner discriminating information notified at the time of the signal arrival.

Consequently, when a large number of receipt rejections, the specifying of the receipt-rejected communication partner can be done easily. This is still another advantageous functional effect of the present disclosure.

According to the fifteenth or sixteenth aspect of the present disclosure, in the facsimile device, the communication control information in connection with the communication relating to the signal arrival from the communication partner not registered in the aforementioned registrating table includes the date and time information read out from the time counting medium at the time of the signal arrival.

Consequently, the time when the signal arrives can be easily specified for the communication relating to the receipt rejection of the respective cases. This is still another advantageous functional effect of the present disclosure.

The preferred embodiment of the present disclosure (aspects of the invention) and the advantageous functional effects thereof over the background art(s) have been described heretofore. However, numerous additional modifications and variations of the present invention are possible in light of the above teachings. It is therefore to be understood that within the scope of the appended claims, the present invention may be practiced otherwise than as specifically described herein.

This application claims benefit of priority under 35 U.S.C. 120 Japanese Patent Application No. JPAP 11-249630 filed in the Japanese Patent Office on Sep. 3, 1999, the entire contents of which are incorporated by reference.

What is claimed is:

1. A facsimile device provided with a receipt-rejected function of rejecting message receipt from a communication partner other than communication partners previously registered in a receipt-allowed communication partner registering table, said facsimile device comprising:

a communication control information storage medium configured to store receipt-rejected communication control information for receipt-rejected communications as well as normal communication control information for receipt-allowed communications;

a receipt-rejected communication control device collecting said receipt-rejected communication control information in connection with a communication relating to the message arrival from the communication partner not registered in said receipt-allowed communication partner registering table, and storing said receipt-rejected collected communication control information, along with said normal communication control information for said receipt-allowed communication, in said communication control information storage medium;

a communication control list creating medium selectively extracting said receipt-rejected communication control information from said communication control information storage medium storing both said normal communication control information and said receipt-rejected communication control information, and creating a list on the basis of the selectively extracted communication control information from said communication control information storage medium, said list including for each communication identified in the list, date and time of the communication; and a list outputting medium visibly outputting said list created by said communication control list creating medium, wherein when said communication relating to the message arrival from said communication partner not registered in said receipt-allowed communication partner registering table is rejected, a facsimile receiving process is not performed by said facsimile device for the receipt-rejected communication, wherein for a receipt-rejected communication partner, said list shows a plurality of rejected communications from the receipt-rejected communication partner including for each rejected communication from the receipt-rejected communication partner the date and time of the rejected communication and wherein said list only shows the plurality of rejected communications from receipt-rejected communication partners including for each rejected communication from the receipt-rejected communication partner the date and time of the rejected communication.

2. The facsimile device provided with a receipt-rejecting function as defined in claim 1, wherein the receipt-rejected communication control information collected by said receipt-rejected communication control device and stored in said communication control information storing medium in connection with the communication relating to the message arrival from the communication partner not registered in said receipt-allowed communication partner registering table includes communication partner identifying information.

3. The facsimile device provided with a receipt-rejecting, functions as defined in claim 2, further comprising a time counting medium for counting the present date and time, wherein the receipt-rejected communication control information collected by said receipt-rejected communication control device and stored in said receipt-rejected communication control information storage medium in connection with the communication relating to the message arrival from the communication partner not registered in said receipt-allowed communication partner registering table includes the date-and-time information read out from said time counting medium at the time of the message arrival.

4. The facsimile device provided with a receipt-rejecting functions as defined in claim 1, further comprising a time counting medium for counting the present date and time, wherein the receipt-rejected communication control information collected by said receipt-rejected communication control device and stored in said communication control information storage medium in connection with the communication relating to the message arrival from the communication partner not registered in said receipt-allowed communication partner registering table includes the date-and-time information read out from said time counting medium at the time of the message arrival.

5. A method of controlling a facsimile device provided with a receipt-rejected function of rejecting message receipt from a communication partner other than a communication partner previously registered in a receipt-allowed communication partner registering table, said method comprising the steps of:

collecting receipt-rejected communication control information in connection with a communication relating to the message arrival from the communication partner not registered in said receipt-allowed communication partner registering table;

storing said collected receipt-rejected communication control information, as well as normal communication control information for receipt-allowed communications, in a communication control information storage medium;

selectively extracting said receipt-rejected communication control information from said communication control information storage medium storing both said normal communication control information and said receipt-rejected communication control information, and creating a list on the basis of the selectively extracted communication control information from said communication control information storage medium;

selectively extracting said receipt-rejected communication control communication and visibly outputting said created list of image information, wherein when said communication relating to the message arrival from said communication partner not registered in said receipt-allowed communication partner registering table is rejected, a facsimile receiving process is not performed by said facsimile device for the receipt-rejected communication, and wherein for a receipt-rejected communication partner, said list shows a plurality of rejected communications from the receipt-rejected communication partner including for each rejected communication from the receipt-rejected communication partner the date and time of the rejected communication.

6. The method of controlling the facsimile device provided with a receipt-rejecting function as defined in claim 5, wherein the receipt-rejected communication control information stored in said communication control information storing medium in connection with the communication relating to the message arrival from the communication partner not registered in said receipt-allowed communication partner registering table includes communication partner identifying information.

7. The method of controlling the facsimile device provided with a receipt-rejecting function as defined in claim 6 further comprising:
    counting the present date and time by use of a time counting medium,
    wherein said collected receipt-rejected communication control information in said communication control information storage medium in connection with the communication relating to the message arrival from the communication partner not registered in said receipt-allowed communication partner registering table includes the date-and-time information read out from said time counting medium at the time of the message arrival.

8. The method of controlling the facsimile device provided with a receipt-rejecting function as defined in claim 6,
    wherein said collected receipt-rejected communication control information stored in said communication control information storage medium in connection with the communication relating to the message arrival from the communication partner not registered in said receipt-allowed communication partner registering table includes the date-and-time information read out at the time of the message arrival.

9. The method of controlling the facsimile device provided with a receipt-rejecting function as defined in claim 5, wherein the receipt-rejected communication control information stored in said communication control information storing medium along with said normal communication control information includes communication partner identifying information.

10. The method of controlling the facsimile device provided with a receipt-rejecting function as defined in claim 5 further comprising:
    counting the present date and time by use of a time counting medium,
    wherein said collected receipt-rejected communication control information stored in said communication control information storage medium in connection with the communication relating to the message arrival from the communication partner not registered in said receipt-allowed communication partner registering table includes the date-and-time information read out from said time counting medium at the time of the message arrival.

11. The method of controlling the facsimile device provided with a receipt-rejecting function as defined in claim 5,
    wherein said collected receipt-rejected communication control information stored in said communication control information storage medium in connection with the communication relating to the message arrival from the communication partner not registered in said receipt-allowed communication partner registering table includes the date-and-time information read out at the time of the message arrival.

12. A facsimile device provided with a receipt-rejected function of rejecting message receipt from a communication partner other than communication partners previously registered in a receipt-allowed communication partner registering table, said facsimile device comprising:
    a communication control information storage medium configured to store receipt-rejected communication control information for receipt-rejected communications as well as normal communication control information for receipt-allowed communications;
    a normal communication control medium collecting said normal communication control information in connection with a communication relating to a message receipt from a registered communication partner registered in a transmission-allowed communication partner registering table or in said receipt-allowed communication partner registering table and storing said collected normal communication control information in said communication control information storage medium;
    a receipt-rejected communication control medium collecting said receipt-rejected communication control information in connection with a communication relating to message arrival from the communication partner not registered in said receipt-allowed communication partner registering table, and storing said collected receipt-rejected communication control information in a said communication control information storage medium;
    a communication control list creating medium selectively extracting one of (i) both said normal communication control information and said receipt-rejected communication control information stored in said communication control information storage medium and (ii) only said receipt-rejected communication control information from said communication control information storage medium, and creating a list on the basis of the selectively extracted communication control information from said communication control information storage medium, said list including for each communication identified in the list date and time of the communication; and
    a list outputting medium visibly outputting said list created by said communication control list creating medium,
    wherein when said communication relating to the message arrival from said communication partner not registered in said receipt-allowed communication partner registering table is rejected, a facsimile receiving process is not performed by said facsimile device for the receipt-rejected communication, and
    wherein for a receipt-rejected communication partner, said list shows a plurality of rejected communications from the receipt-rejected communication partner including for each rejected communication from the receipt-rejected communication partner the date and time of the rejected communication, and
    wherein said list only shows the plurality of rejected communications from receipt-rejected communication partners including for each rejected communication from the receipt-rejected communication partner the date and time of the rejected communication.

13. The facsimile device provided with a receipt-rejecting function as defined in claim 12, wherein the receipt-rejected communication control information collected by said receipt-rejected communication control medium and stored in said communication control information storing medium in connection with the communication relating to the message arrival from the communication partner not registered in said receipt-allowed communication partner registering table includes communication partner identifying information.

14. The facsimile device provided with a receipt-rejecting functions as defined in claim 13, further comprising a time counting medium for counting the present date and time,
wherein the receipt-rejected communication control information collected by said receipt-rejected communication control medium and stored in said receipt-rejected communication control information storage medium in connection with the communication relating to the message arrival from the communication partner not registered in said receipt-allowed communication partner registering table includes the date-and-time information read out from said time counting medium at the time of the message arrival.

15. The facsimile device provided with a receipt-rejecting functions as defined in claim 12, further comprising a time counting medium for counting the present date and time,
wherein the receipt-rejected communication control information collected by said receipt-rejected communication control medium and stored in said receipt-rejected communication control information storage medium in connection with the communication relating to the message arrival from the communication partner not registered in said receipt-allowed communication partner registering table includes the date-and-time information read out from said time counting medium at the time of the message arrival.

16. A method of controlling a facsimile device provided with a receipt-rejected function of rejecting message receipt from a communication partner other than communication partners previously registered in a receipt-allowed communication partner registering table, said method comprising the steps of:
collecting normal communication control information in connection with communication relating to message receipt from a communication partner registered in a transmission-allowed communication partner registering table or in said receipt-allowed communication partner registering table;
storing said normal collected communication control information in a communication control information storage medium;
collecting receipt-rejected communication control information in connection with communication relating to the message arrival from the communication partner not registered in said receipt-allowed communication partner registering table;
storing said collected receipt-rejected communication control information in said communication control information storing medium, along with said normal communication control information;
selectively extracting one of (i) both said normal communication control information and said receipt-rejected communication control information stored in said communication control information storage medium and (ii) only said receipt-rejected communication control information from said communication control information storage medium;
creating a list of image information on the basis of the selectively extracted communication control information from said communication control information storage medium, said list including for each communication identified in the list, date and time of the communication; and
visibly outputting said list created by said communication control list creating medium,
wherein when said communication relating to the message arrival from said communication partner not registered in said receipt-allowed communication partner registering table is rejected, a facsimile receiving process is not performed by said facsimile device for the receipt-rejected communication, and
wherein for a receipt-rejected communication partner, said list shows a plurality of rejected communications from the receipt-rejected communication partner including for each rejected communication from the receipt-rejected communication partner the date and time of the rejected communication, and
wherein said list only shows the plurality of rejected communications from receipt-rejected communication partners including for each rejected communication from the receipt-rejected communication partner the date and time of the rejected communication.

17. The method of controlling the facsimile device provided with a receipt-rejecting function as defined in claim 16, wherein the receipt-rejected communication control information stored in said communication control information storing medium in connection with the communication relating to the message arrival from the communication partner not registered in said receipt-allowed communication partner registering table includes communication partner identifying information.

18. The method of controlling the facsimile device provided with a receipt-rejecting function as defined in claim 17 further comprising the steps of:
counting the present date and time by use of a time counting medium;
collecting said communication control information by use of said receipt-rejected communication control medium; and
storing said collected communication control information in said receipt-rejected communication control information storing medium in connection with the communication relating to the message arrival from the communication partner not registered in said receipt-allowed communication partner registering table so as to include the date-and-time information read out from said time counting medium at the time of the message arrival.

19. The method of controlling the facsimile device provided with a receipt-rejecting function as defined in claim 17,
wherein said collected receipt-rejected communication control information stored in said communication control information storage medium in connection with the communication relating to the message arrival from the communication partner not registered in said receipt-allowed communication partner registering table includes the date-and-time information at the time of the message arrival.

20. The method of controlling the facsimile device provided with a receipt-rejecting function as defined in claim 16, wherein the receipt-rejected communication control information stored in said communication control information storing medium along with said normal communication control information includes communication partner identifying information.

21. The method of controlling the facsimile device provided with a receipt-rejecting function as defined in claim 16 further comprising:

counting the present date and time by use of a time counting medium, wherein said collected receipt-rejected communication control information stored in said communication control information storage medium in connection with the communication relating to the message arrival from the communication partner not registered in said receipt-allowed communication partner registering table includes the date-and-time information read out from said time counting medium at the time of the message arrival.

22. The method of controlling the facsimile device provided with a receipt-rejecting function as defined in claim 16, wherein said collected receipt-rejected communication control information stored in said communication control information storage medium in connection with the communication relating to the message arrival from the communication partner not registered in said receipt-allowed communication partner registering table, includes the date-and-time information read out at the time of the message arrival.

23. A facsimile device provided with a receipt-rejected function of rejecting the message receipt from a communication partner excluding communication partners previously registered in a receipt-allowed communication partner registered in a receipt-allowed communication partner registering table, said facsimile device comprising:

communication control information storage means for storing receipt-rejected communication control information for receipt-rejected communication as well as normal communication control information for receipt-allowed communications;

receipt-rejected communication control means collecting receipt-rejected communication control information in connection with a communication relating to message arrival from the communication partner not registered in said receipt-allowed communication partner registering table, and storing said collected receipt-rejected communication control information in said communication control information storage means;

communication control list creating means selectively extracting said receipt-rejected communication control information from said communication control information storage means storing both said normal communication control information and said receipt-rejected communication control information, and creating a list on the basis of the receipt-rejected communication control information selectively extracted from said communication control information storage means, said list including for each communication identified in the list, date and time of the communication; and list outputting means visibly outputting said list of created by said communication control list creating means, wherein when said communication relating to the message arrival from said communication partner not registered in said receipt-allowed communication partner registering table is rejected, a message receiving process is not performed by said facsimile device for the receipt-rejected communication, wherein for a receipt-rejected communication partner, said list shows a plurality of rejected communications from the receipt-rejected communication partner including for each rejected communication from the receipt-rejected communication partner the date and time of the rejected communication, and wherein said list only shows the plurality of rejected communications from receipt-rejected communication partners including for each rejected communications from the receipt-rejected communication partner the date and time of the rejected communication.

24. A facsimile device provided with a receipt-rejected function of rejecting the message receipt from a communication partner excluding communication partners previously registered in a receipt-allowed communication partner registering table, said facsimile device comprising:

communication control information storage means for storing receipt-rejected communication control information for receipt-rejected communications as well as normal communication control information for receipt-allowed communications;

normal communication control means collecting normal communication control information in connection with a communication relating to message receipt from a communication partner registered in a transmission-allowed communication partner registering table or in said receipt-allowed communication partner registering table and storing said collected normal communication control information in said communication control information storage means;

receipt-rejected communication control means collecting receipt-rejected communication control information in connection with a communication relating to message arrival from the communication partner not registered in said receipt-allowed communication partner registering table, and storing said collected receipt-rejected communication control information in said communication control information storage means;

communication control list creating means selectively extracting one of (i) both said normal communication control information and said receipt-rejected communication control information stored in said communication control information storage means and (ii) only said receipt-rejected communication control information from said communication control information storage means, and creating a list on the basis of the selectively extracted communication control information from said communication control information storage means, said list including for each communication identified in the list, date and time of the commutation; and list outputting means visibly outputting said list created by said communication control list creating means, wherein when said communication relating to the message arrival from said communication partner not registered in said receipt-allowed communication partner registering table is rejected, a message receiving process is not performed by said facsimile device for the receipt-rejected communication, wherein for a receipt-rejected communication partner, said list shows a plurality of rejected communications from the receipt-rejected communication partner including for each rejected communication from the receipt-rejected communication partner the date and time of the rejected communication, and wherein said list only shows the plurality of rejected communications from receipt-rejected communication partners including for each rejected communication from the receipt-rejected communication partner the date and time of the rejected communication.

25. A communication terminal device provided with a receipt-rejected function of rejecting message receipt from a communication partner other than communication partners previously registered in a receipt-allowed communication partner registering table, said communication terminal device comprising:
- a communication control information storage medium configured to store receipt-rejected communication control information for receipt-rejected communications as well as normal communication control information for receipt-allowed communications;
- a receipt-rejected communication control medium collecting said receipt-rejected communication control information in connection with a communication relating to the message arrival from the communication partner not registered in said receipt-allowed communication partner registering table, and storing said receipt-rejected collected communication control information in said communication control information storage medium;
- a communication control list creating medium selectively extracting communication control information from said communication control information storage medium storing both said normal communication control information and said receipt-rejected communication control information, and creating a list of the selectively extracted communication control information; and
- a list outputting medium visibly outputting said list of the selectively extracted communication control information,
- wherein said list of the selectively extracted communication control information includes, for each communication identified in the list, date and time of the communication message and exchange mode information.

26. The communication terminal device provided with a receipt-rejecting function as defined in claim 25, wherein the message exchange mode information includes a signal exchange mode at the time of communication with the communication partner.

27. The communication terminal device provided with a receipt-rejecting function as a defined in claim 25, wherein one or more of the communications indicated in the created list includes a corresponding transmitted or received image, and the message exchange mode information for the communication includes line density of the transmitted or received image.

28. The communication terminal device provided with a receipt-rejecting function as defined in claim 25, wherein for one or more of the communications indicated in the created list, the message exchange mode information for the communication indicates memory transmission or memory reception.

29. A method of controlling a communication terminal device provided with a receipt-rejected function of rejecting message receipt from a communication partner other than a communication partner previously registered in a receipt-allowed communication partner registering table, said method comprising the steps of:
- collecting receipt-rejected communication control information in connection with a communication relating to the message arrival from the communication partner not registered in said receipt-allowed communication partner registering table;
- storing said collected receipt-rejected communication control information, as well as normal communication control information for receipt-allowed communications, in a communication control information storage medium;
- selectively extracting communication control information from said communication control information storage medium storing both said normal communication control information and said receipt-rejected communication control information, and creating a list of the selectively extracted communication control information; and
- visibly outputting said created list of the selectively extracted communication control information,
- wherein said list of the selectively extracted communication control information includes, for each communication identified in the list, date and time of the communication message and exchange mode information.

30. A communication terminal device provided with a receipt-rejected function of rejecting message receipt from a communication partner other than communication partners preciously registered in a receipt-allowed communication partner registering table, said communication terminal device comprising:
- a communication control information storage medium configured to store receipt-rejected communication control information for receipt-rejected communications as well as normal communication control information for receipt-allowed communications;
- a normal communication control medium collecting said normal communication control information in connection with a communication relating to a message receipt from a registered communication partner registered in a transmission-allowed communication partner registering table or in said receipt-allowed communication partner registering table and storing said collected normal communication control information in said communication control information storage medium;
- a receipt-rejected communication control medium collecting said receipt-rejected communication control information in connection with a communication relating to message arrival from the communication partner not registered in said receipt-allowed communication partner registering table, and storing said collected receipt-rejected communication control information in said communication control information storage medium;
- a communication control list creating medium selectively extracting one of (i) both said normal communication control information and said receipt-rejected communication control information stored in said communication control information storage medium and (ii) only said receipt-rejected communication control information from said communication control information storage medium, and creating a list of the selectively extracted communication control information from said communication control information storage medium; and
- a list outputting medium visibly outputting said list of the selectively extracted communication control information,
- wherein said list of the selectively extracted communication control information includes, for each communication identified in the list, date and time of the communication message and exchange mode information.

31. A method of controlling a communication terminal device provided with a receipt-rejected function of rejecting message receipt from a communication partner other than a communication partner previously registered in a receipt-allowed communication partner registering table, said method comprising the steps of:

collecting normal communication control information in connection with communication relating to message receipt from a communication partner registered in a transmission-allowed communication partner registering table or in said receipt-allowed communication partner registering table;

storing said collected normal communication control information in a communication control information storage medium;

collecting receipt-rejected communication control information in connection with communication relating to the message arrival from the communication partner not registered in said receipt-allowed communication partner registering table;

storing said collected receipt-rejected communication control information in said communication control information storing medium, along with said normal communication control information;

selectively extracting one of (i) both said normal communication control information and said receipt-rejected communication control information stored in said communication control information storage medium and (ii) only said receipt-rejected communication control information from said communication control information storage medium;

creating a list of the selectively extracted communication control information from said communication control information storage medium; and visibly outputting said list of the selectively extracted communication control information, wherein the selectively extracted information based on which said list of the selectively extracted communication control information is created includes, for each communication identified in the list, date and time of the communication message and exchange mode information.

* * * * *